United States Patent
Magai et al.

(10) Patent No.: US 8,457,446 B2
(45) Date of Patent: Jun. 4, 2013

(54) IMAGE RETRIEVAL APPARATUS, IMAGE RETRIEVAL METHOD, AND STORAGE MEDIUM

(75) Inventors: Koichi Magai, Tokyo (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 397 days.

(21) Appl. No.: 12/857,300

(22) Filed: Aug. 16, 2010

(65) Prior Publication Data
US 2011/0058746 A1 Mar. 10, 2011

(30) Foreign Application Priority Data
Sep. 4, 2009 (JP) .................. 2009-205213

(51) Int. Cl.
G06K 9/54 (2006.01)
G06K 9/60 (2006.01)
(52) U.S. Cl.
USPC ..... 382/305; 358/403; 707/821; 707/E17.019
(58) Field of Classification Search
USPC ........... 382/305; 358/403, 404; 707/821–831, 707/E17.014–E17.017, E17.019–E17.031
See application file for complete search history.

(56) References Cited

U.S. PATENT DOCUMENTS

| | | | |
|---|---|---|---|
| 6,389,417 B1* | 5/2002 | Shin et al. | 1/1 |
| 6,774,917 B1* | 8/2004 | Foote et al. | 715/700 |
| 7,031,555 B2* | 4/2006 | Troyanker | 382/305 |
| 8,224,839 B2* | 7/2012 | Krupka et al. | 707/765 |
| 2003/0231806 A1* | 12/2003 | Troyanker | 382/305 |
| 2007/0276867 A1* | 11/2007 | Fishbaine et al. | 707/104.1 |
| 2008/0219517 A1* | 9/2008 | Blonk et al. | 382/118 |
| 2008/0313179 A1* | 12/2008 | Trepess et al. | 707/5 |
| 2009/0024597 A1* | 1/2009 | Imielinski | 707/4 |
| 2009/0070326 A1* | 3/2009 | Kraft | 707/5 |
| 2009/0216722 A1* | 8/2009 | Lea | 707/3 |
| 2009/0271388 A1* | 10/2009 | Murdock et al. | 707/5 |

FOREIGN PATENT DOCUMENTS
JP H08-249349 A 9/1996

* cited by examiner

*Primary Examiner* — Aaron W Carter
(74) *Attorney, Agent, or Firm* — Canon USA, Inc., I.P. Division

(57) ABSTRACT

An image retrieval apparatus includes a designation unit configured to designate a query area of an image based on a user's designation operation, a display unit configured to display an area where a local feature amount is difficult to be extracted in the query area designated by the designation unit as a feature non-extractable area, and a retrieval unit configured to retrieve, based on a local feature amount extracted from an area which is not displayed as the feature non-extractable area in the query area by the display unit, image feature data with which a local feature amount and the image are associated and which is stored in a storage device.

8 Claims, 12 Drawing Sheets

FIG.6
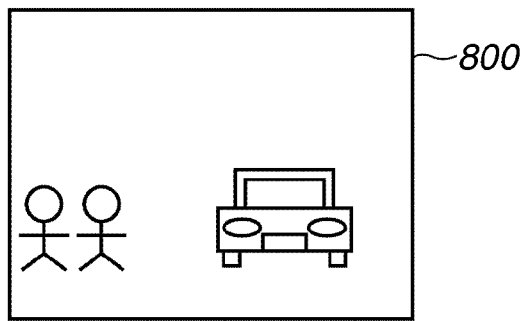
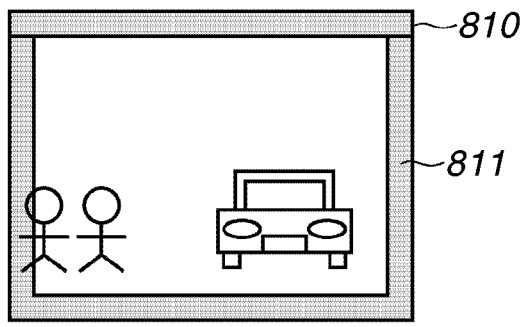
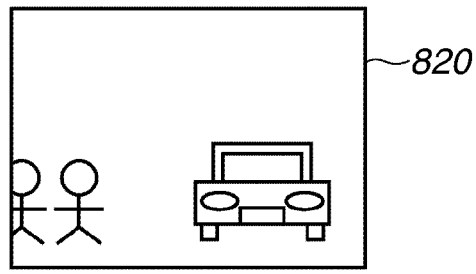
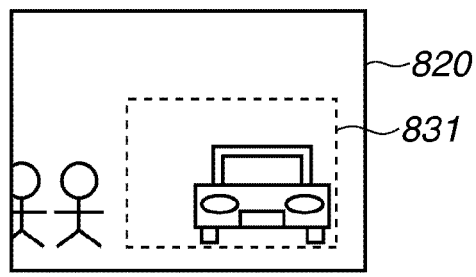
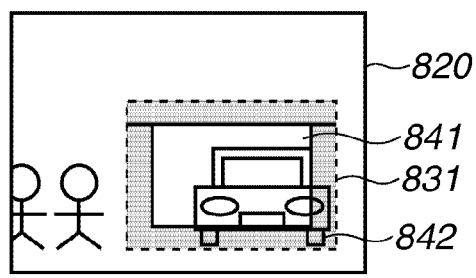

FIG.12
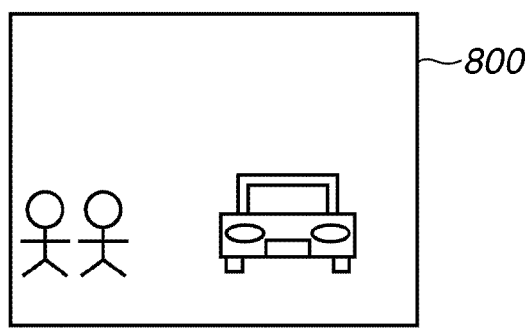
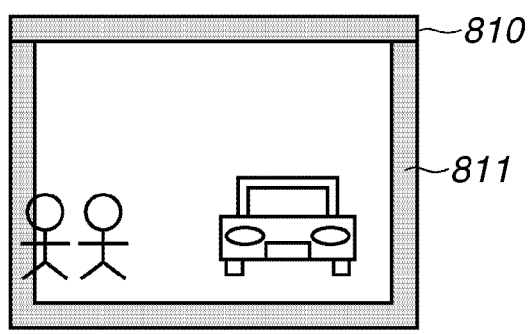
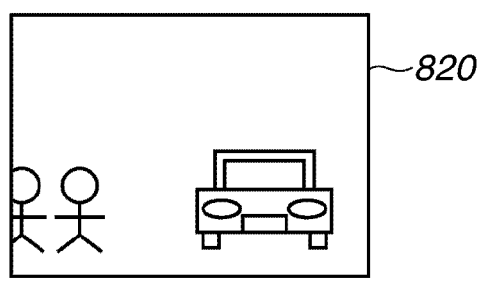
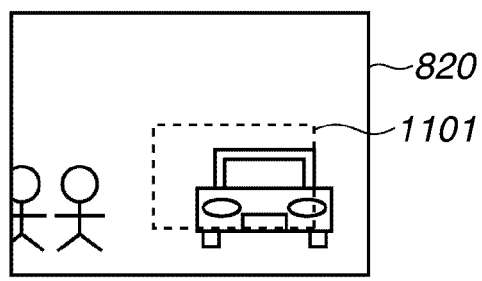
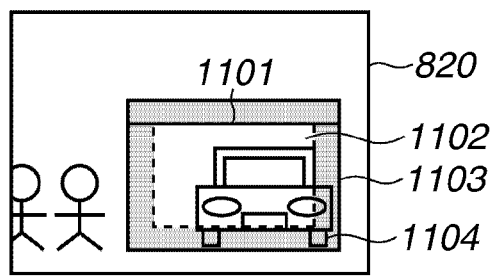

IMAGE RETRIEVAL APPARATUS, IMAGE RETRIEVAL METHOD, AND STORAGE MEDIUM

BACKGROUND OF THE INVENTION

1. Field of the Invention

The present invention relates to an image retrieval apparatus, an image retrieval method, and a computer storage medium.

2. Description of the Related Art

There have been discussed many techniques for retrieving similar images. First, there is a method for retrieving a similar image using an overall feature amount of images. For example, Japanese Patent Application Laid-Open No. 8-249349 discusses a method for retrieving a similar image based on color position information by dividing an image into a plurality of blocks and performing pattern matching based on a representative color of each block.

Second, a method for retrieving a similar image using local feature amounts of images has been discussed. According to these methods, first, feature points (local feature points) are extracted from the images. Then, feature amounts (local feature amounts) are calculated for the local feature points based on the local feature points and image information of their vicinities. Image retrieval is performed by matching local feature amounts with one another.

As regards the above method using the local feature amount, a method has been discussed which can retrieve an image even when then image is rotated, enlarged, or reduced by defining the local feature amount as an amount including a plurality of elements invariant in rotation, enlargement, or reduction (C. Schmid and R. Mohr, "Local gray value invariants for image retrieval," IEEE Trans. PAMI., Vol. 19, No. 5, pp. 530 to 534, 1997).

Many retrieval systems based on local feature amounts perform filter processing such as blurring processing for input images so as to give noise immunity to the image. Generally, the filter processing becomes convolution processing between a filter window and an image. In this case, the filter window protrudes from the image at an edge portion thereof, so that accurate filter processing cannot be performed.

In the edge portion of the image, calculation of a local feature amount is difficult. In calculation of a local feature amount, first, an area (local feature amount calculation area) of a small size around a local feature point is set. Then, a local feature amount is calculated based on a pixel pattern in the local feature amount calculation area. As in the above case, in the edge portion of the image, the local feature amount calculation area protrudes from the image.

Thus, in the retrieval system based on the local feature amount, there are restrictions on calculation of the local feature amount. However, in the conventional retrieval system, consideration to users who have only limited knowledge about the restrictions has been inadequate, and no method has been provided to designate retrieval conditions accurately considering areas where local feature amounts can be calculated. Thus, if a user is unaware that a retrieval area selected as a query is out of an area where a local feature amount can be accurately calculated, the user cannot acquire any retrieval result as intended.

SUMMARY OF THE INVENTION

The present invention is directed to a technique for enabling acquisition of a retrieval result as intended by a user.

According to an aspect of the present invention, there is provided an image retrieval apparatus including a designation unit configured to designate a query area of an image based on a user's designation operation, a display unit configured to display an area where a local feature amount is difficult to be extracted in the query area designated by the designation unit as a feature non-extractable area, and a retrieval unit configured to retrieve, based on a local feature amount extracted from an area which is not displayed as the feature non-extractable area in the query area by the display unit, image feature data with which a local feature amount and the image are associated and which is stored in a storage device.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 illustrates an example of an interface during image segmentation.

FIG. 12 illustrates an example of an interface during image segmentation.

DESCRIPTION OF THE EMBODIMENTS

Various exemplary embodiments, features, and aspects of the invention will be described in detail below with reference to the drawings.

In the description below, an image processing apparatus such as an image registration apparatus or an image retrieval apparatus first investigates a luminance gradient around a local feature point to determine a main direction during calculation of a local feature amount. The image processing apparatus can make the local feature amount invariant with respect to rotation of an image by rotating a local feature amount calculation area around the local feature point according to the main direction.

As a determination method of the main direction, the image processing apparatus uses a method discussed in David G. Lowe, "Distinctive Image Features from Scale-Invariant Keypoints," International Journal of Computer Vision, 60, 2 (2004), pp. 91-110 (hereinafter, referred to as Reference 1). However, a method for determining the main direction is not limited to the method discussed in the Reference 1. Any other method can be used as long as it is difficult to be affected by noise.

In an exemplary embodiment described below, the image processing apparatus uses, for calculation of a local feature amount, a method discussed in Y. Ke and R. Sukthankar, "PCA-SIFT: A More Distinctive Representation for Local Image Descriptors," Proc. CVPR, pp. 506-513, 2004 (hereinafter, referred to as Reference 2). However, the image processing apparatus can employ any other method for calculating a local feature amount as long as the local feature amount is difficult to be affected by noise.

[Image Registration Processing]

Figure 1:
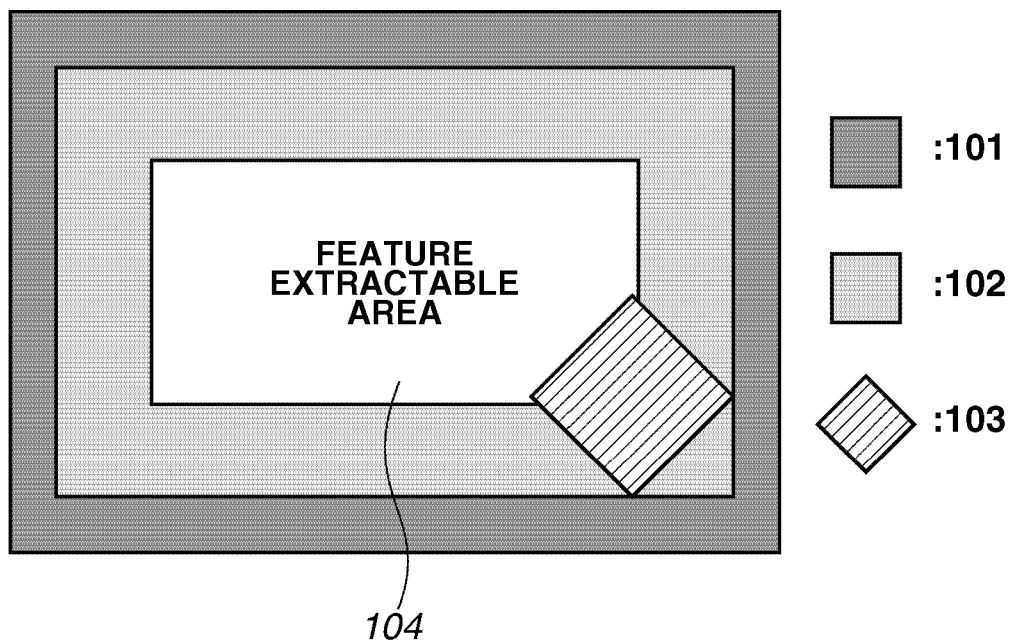
FIG. 1 illustrates an area where a local feature can be extracted and an area where a local feature is difficult to be extracted.

FIG. 1 illustrates an area where a local feature is extractable and an area where a local feature is difficult to be extracted. In FIG. 1, in an area 101, accurate filter processing is difficult due to filter processing. In an area 102, accurate local feature amount calculation is difficult due to a local feature amount calculation area. A local feature amount calculation area 103 is rotated by 45°. A local feature is extracted from an extractable area 104.

Figure 2:
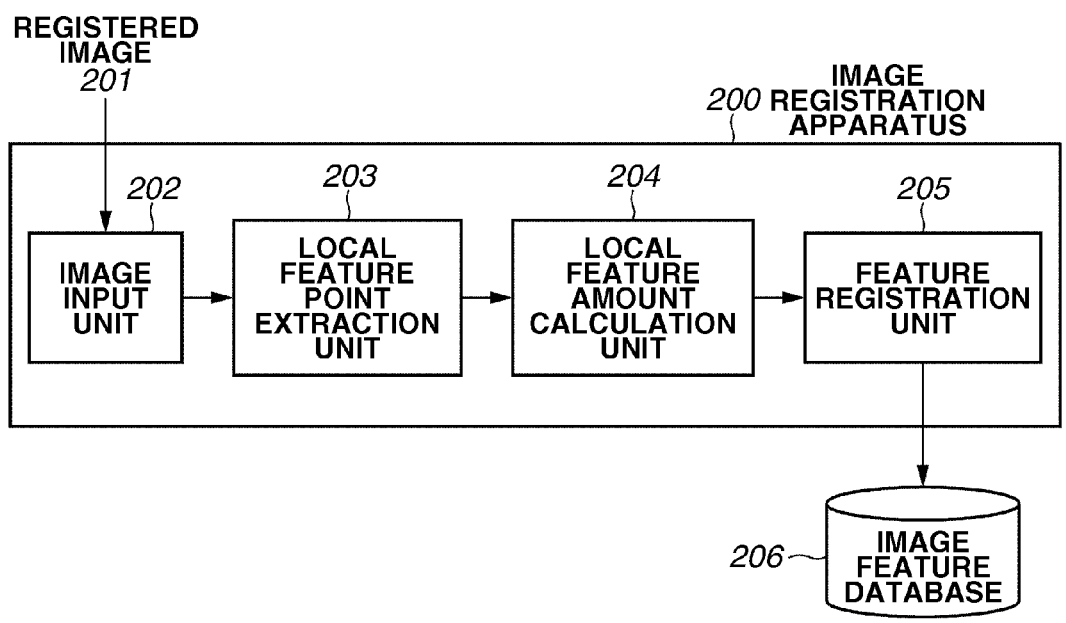
FIG. 2 illustrates an example of a functional configuration of an image registration apparatus.

FIG. 2 illustrates an example of a functional configuration of an image registration apparatus. The image registration apparatus 200 registers an image feature (image feature amount) which is extracted from a registered image 201 in an image feature database 206.

Figure 3:
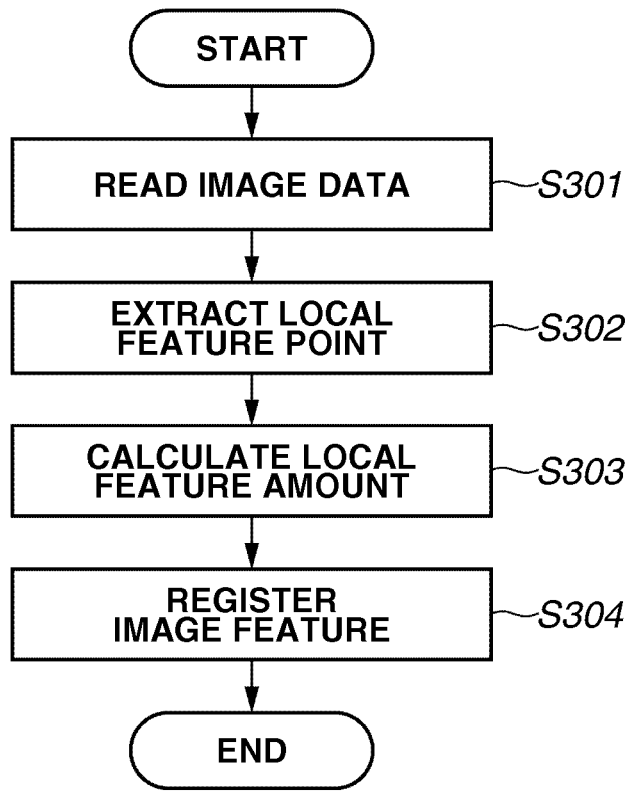
FIG. 3 is a flowchart illustrating an example of image registration processing.

Referring to a flowchart in FIG. 3, image registration processing will be described. FIG. 3 is a flowchart illustrating an example of the image registration processing. In step S301, an image input unit 202 reads the registered image 201. In step S302, a local feature point extraction unit 203 extracts a local feature point from the registered image 201.

In the extraction of the local feature point, the local feature point extraction unit 203 extracts a luminance component from the registered image 201 to generate a luminance component image, reduces the generated luminance component image in stages, and performs blurring processing for each reduced image. The local feature point extraction unit 203 extracts a local feature point from each blurred image thus generated. As an extraction method of the local feature point, a Harris operator is used in the present exemplary embodiment. For details, refer to Reference 3: C. Harris and M. J. Stephens, "A Combined corner and edge detector," In Alvey Vision Conference, pp. 147 to 151, 1988.

The blurring processing is realized by convolution processing between an image and a blur filter, and hence the area 101 illustrated in FIG. 1 where the accurate filter processing is difficult is identified based on a size of the blur filter. In the present exemplary embodiment, a Gaussian filter is employed for the blur filter, and a filter of a range of $3\sigma$ ($\sigma=1.5$) as a parameter is formed. More specifically, a size of the blur filter is 11 pixels*11 pixels, and hence the area 101 where the accurate filter processing is difficult is an area of a 5-pixel width from an edge of the image.

No local feature amount can be calculated from the area 101 where the accurate filter processing is difficult.

The local feature point extraction unit 203 transmits information about the identified area 101 where the accurate filter processing is difficult to a local feature amount calculation unit 204. In step S303, the local feature amount calculation unit 204 calculates a local feature amount using a surrounding pixel value for each feature point extracted by the local feature point extraction unit 203. For the extraction method of the local feature point and the calculation method of the local feature amount, various methods have been discussed. In the present exemplary embodiment, the existing methods are used.

In this case, a size of a local feature amount calculation area has been determined beforehand, and the area 101 where the accurate filter processing is difficult has been established. Thus, the local feature point extraction unit 203 can identify the area 102 where a local feature amount is difficult to be calculated and the extractable area 104 illustrated in FIG. 1.

In the present exemplary embodiment, the local feature amount is calculated by the method of the Reference 2, and hence a size of the local feature amount calculation area is 41 pixels*41 pixels. A width of the area 102 where the local feature amount is difficult to be calculated is largest when the local feature amount calculation area is rotated by 45°. The width in this case is 29 pixels.

In the description below, the area 101 where the accurate filter processing is difficult and the area 102 where the local feature amount is difficult to be calculated may be collectedly referred to as a feature non-extractable area. In the present exemplary embodiment, a feature non-extractable area is a range of a 34-pixel width from the edge of the image. In a query image, an area other than the feature non-extractable area may be referred to as an extractable area.

Calculation of the local feature amount is performed in the extractable area 104. In step S304, a feature registration unit 205 converts the local feature amount calculated in step S303 into a feature amount representation form so as to be registered in the image feature database 206, and registers the local feature amount of the feature amount representation form as image feature data in association with the registered image in the image feature database 206.

Next, referring to FIGS. 4 and 5, image retrieval processing and processing for visually displaying an extractable area will be described.

Figure 4:
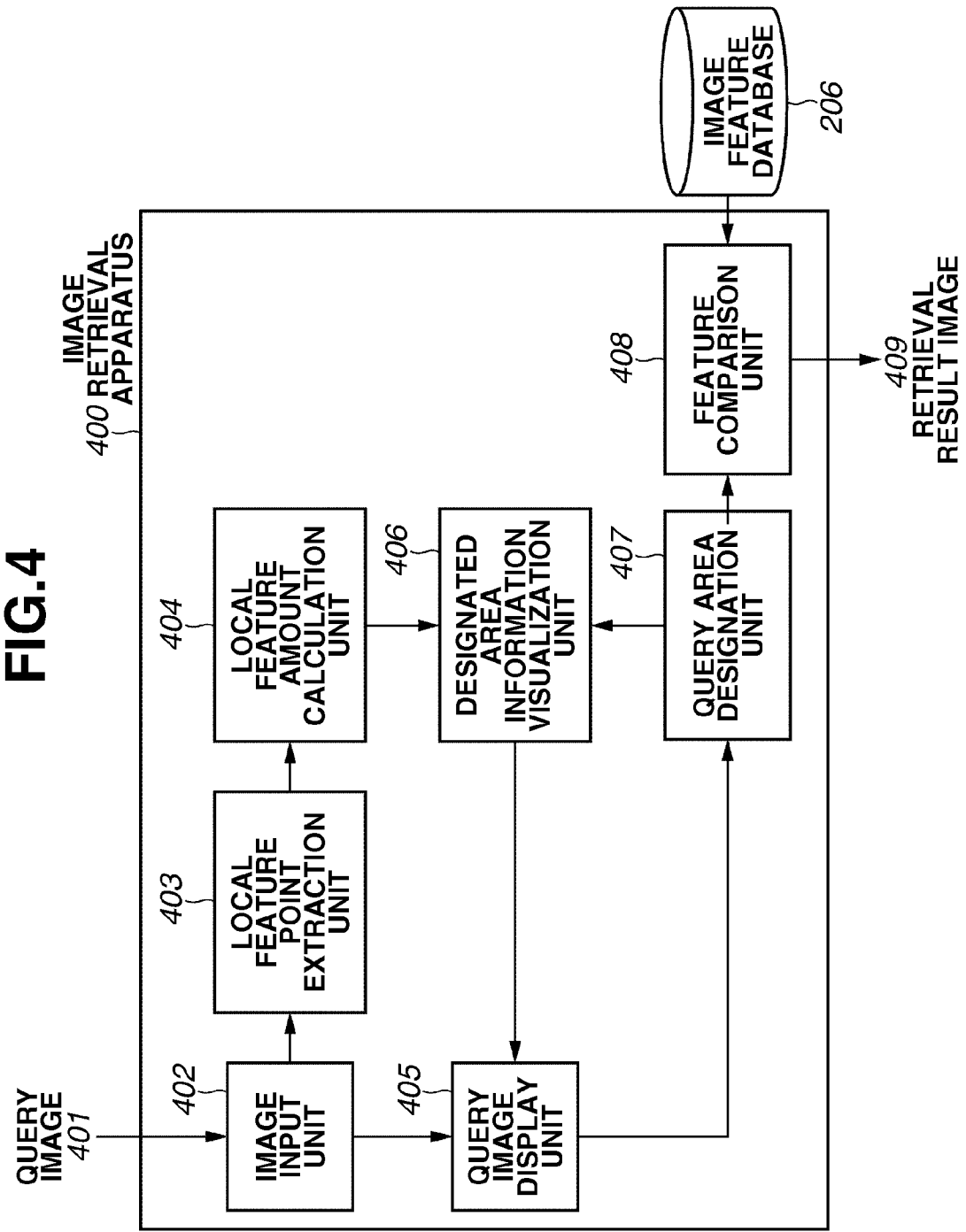
FIG. 4 illustrates a first functional configuration of an image retrieval apparatus.
Figure 5:
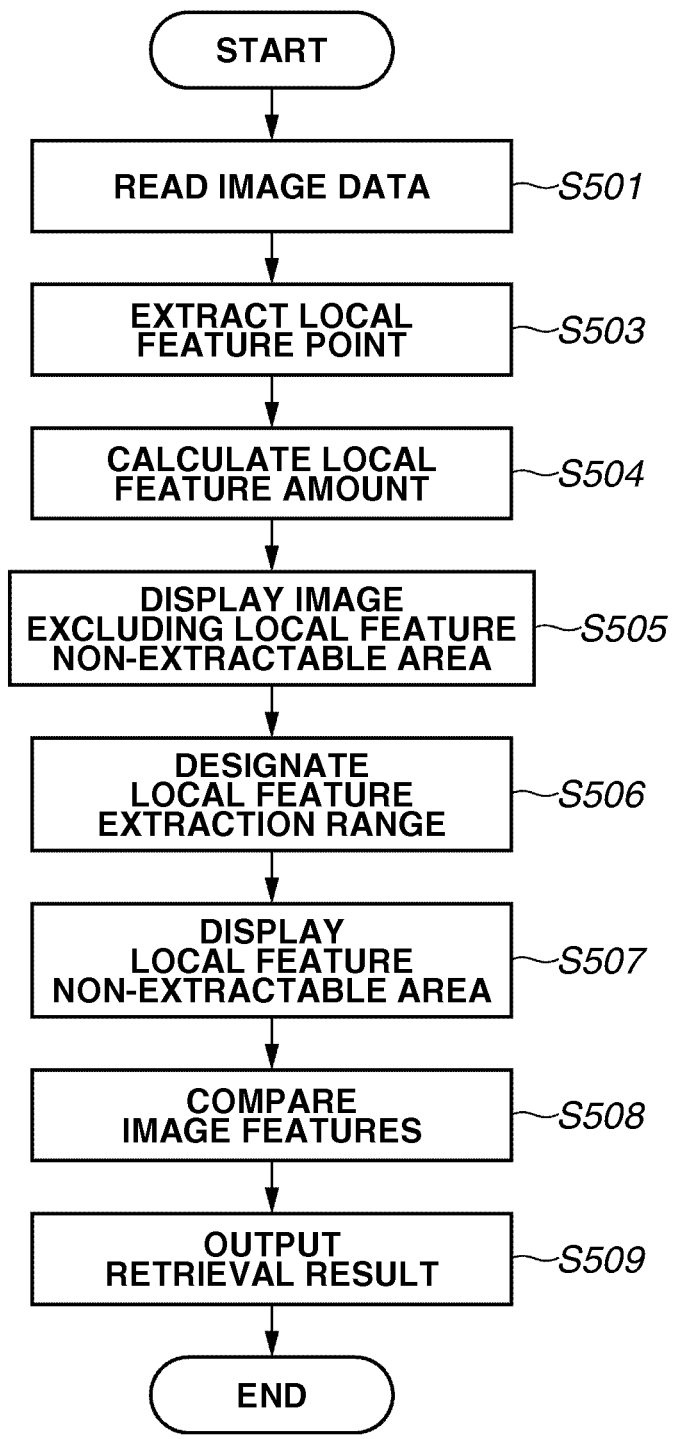
FIG. 5 is a first flowchart illustrating an example of image retrieval processing and visualization processing of an extractable area.

FIG. 4 illustrates a first functional configuration of an image retrieval apparatus 400. FIG. 5 is a first flowchart illustrating image retrieval processing and visualization processing of an extractable area.

In step S501, an image input unit 402 reads a query image 401. The read query image 401 is transmitted to a query image display unit 405. In step S503, a local feature point extraction unit 403 extracts a local feature point from the query image 401. For the extraction of the local feature point, the local feature point extraction unit 403 extracts a luminance component from the query image 401 to generate a luminance component image, reduces the luminance component image in stages, and performs blurring processing for each reduced image. The local feature point extraction unit 403 extracts a local feature point from each blurred image thus generated.

The blurring processing is realized by convolution processing between the image and a blur filter, and hence the local feature point extraction unit 403 can identify the area 101 illustrated in FIG. 1 where the accurate filter processing is difficult based on the size of the blur filter. No local feature amount can be calculated from the area 101 where the accurate filer processing is difficult. The local feature point extraction unit 403 transmits information about the identified area 101 where the accurate filter processing is difficult to a local feature amount calculation unit 404.

In step S504, the local feature amount calculation unit 404 calculates, for each extracted feature point, a local feature amount using a surrounding pixel value. For the extraction method of the local feature point and the calculation method of the local feature amount, various methods have been proposed, and these existing methods are used.

The size of the local feature amount calculation area has been determined beforehand, and the area 101 where the accurate filter processing is difficult has been established, and hence the local feature amount calculation unit 404 can identify the area 102 where the local feature amount is difficult to be calculated and the extractable area 104 illustrated in FIG. 1. More specifically, the calculation of the local feature amount is performed in the extractable area 104. A designated area information visualization unit 406 first receives the local feature amount calculated in step S504, the area 101 where the accurate filter processing is difficult, the area 102 where the local feature amount is difficult to be calculated, and the extractable area 104 from the local feature amount calculation unit 404. Then, the designated area information visualization unit 406 transmits the extractable area 104 to the query image display unit 405. In step S505, the query image display unit 405 displays only the extractable area 104 of the received query image.

In step S506, based on a user's designation operation, a query area designation unit 407 designates an image area designated by a user to be used for retrieval as a local feature extraction range from the query image. The query area designation unit 407 transmits the local feature extraction range to the designated area information visualization unit 406. The designated area information visualization unit 406 identifies a feature non-extractable area within the local feature extraction range based on the size of the blur filter and the size of the local feature amount calculation area, and transmits information about the feature non-extractable area to the query image display unit 405. In step S507, the query image display unit 405 displays the feature non-extractable area by shading. More specifically, an area displayed without shading in the local feature extraction range becomes an extractable area.

In the present exemplary embodiment, the local feature amount has been calculated from within the local feature extraction range in step S504. Thus, no feature non-extractable area is present within the local feature extraction range, and areas within the local feature extraction range are all feature extractable areas.

In step S508, a feature comparison unit 408 searches in the image feature database 206 using only a local feature (image feature) present in the extractable area. In step S509, the feature comparison unit 408 outputs an image associated with the image feature as a retrieval result image 409.

Referring to FIG. 6, a part of the above processing will be described. FIG. 6 illustrates an example of an interface during image segmentation. More specifically, FIG. 6 illustrates a query image 800 read by the image input unit 402, a query image 810 where a feature non-extractable area has been established, and a gray portion 811 indicating the feature non-extractable area.

FIG. 6 further illustrates a query image 820 where only the extractable area displayed in step S505 is displayed, a local feature extraction range 831 designated by the user in step S506, a feature non-extractable area 842 displayed by shading in step S507, and an extractable area 841. As indicated by the feature non-extractable area 842, an area of a fixed width inside from an edge of an area designated by the user basically becomes a feature non-extractable area.

More specifically, retrieval is executed using only a local feature present in the extractable area 841. However, the local feature amount has been calculated from within the local feature extraction range in step S504 as described above, and hence there is no feature non-extractable area 842 displayed by shading. In the above description, the extractable area 841 corresponds to the local feature extraction range 831 designated by the user.

In the above description, the local feature extraction range is designated in step S506. After the displaying of the local feature non-extractable area in step S507, the retrieval is executed using only the local feature present in the extractable area in steps S508 and S509. With this configuration, when the user designates a wrong local feature extraction range, the local feature extraction range cannot be corrected. Thus, for example, the query image display unit 405 may ask the user whether to correct the local feature extraction range in step S507.

When correction of the local feature extraction range is necessary, the query image display unit 405 returns the processing to step S506. A correction method of the local feature extraction range may designate a new local feature extraction range, or correct the designated local feature extraction range. As a method for correcting the designated local feature extraction range, parallel movement or deformation may be used. Even after the correction of the designated local feature extraction range, cancellation of the designated local feature extraction range may be permitted. When the designation is canceled, a new local feature extraction range may be designated.

Figure 7:
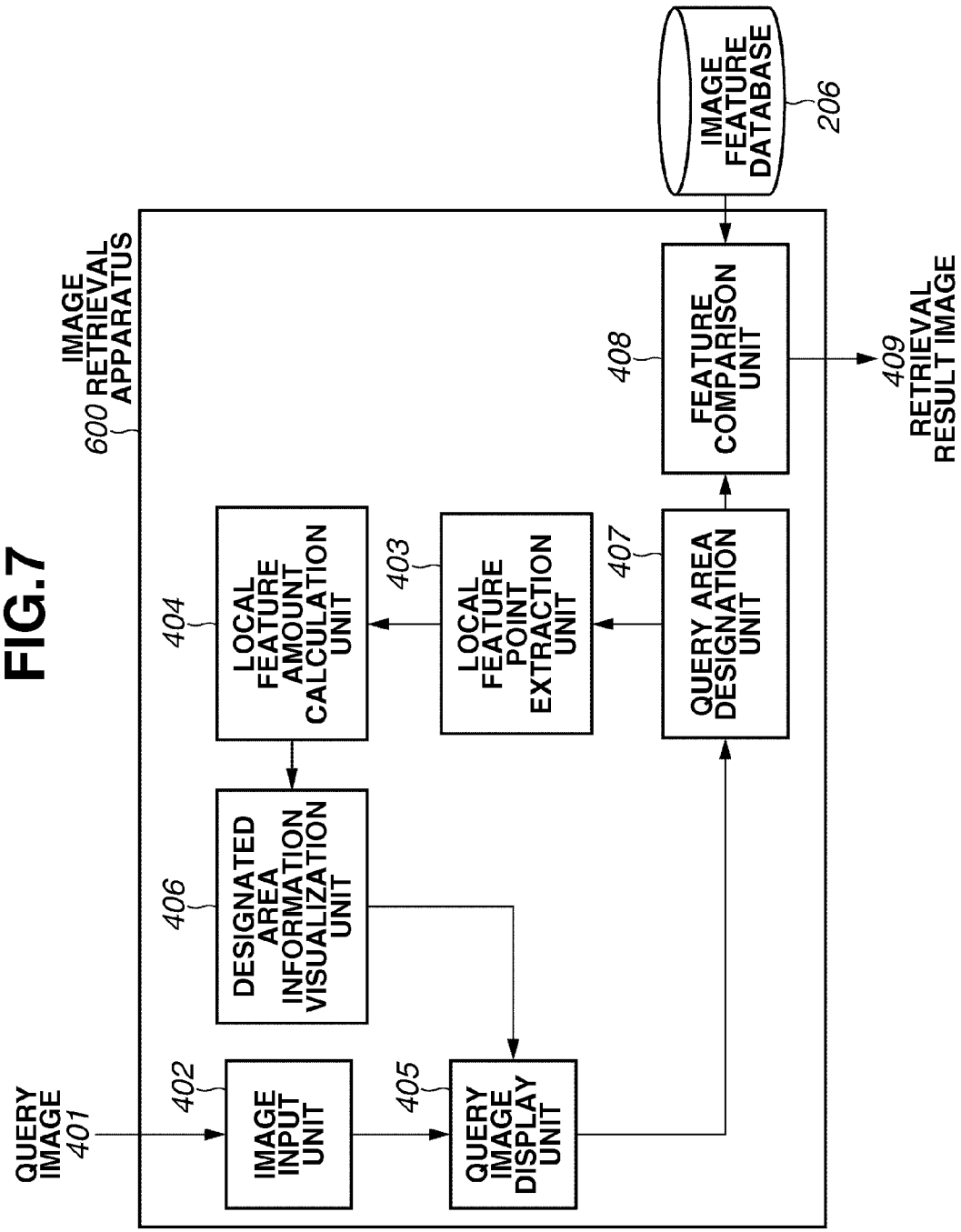
FIG. 7 illustrates a second functional configuration of the image retrieval apparatus.

In the above configuration, in step S501, the image input unit 402 reads the query image 401. In step S503, the local feature point extraction unit 403 extracts the local feature point from the query image 401. In step S504, the local feature amount calculation unit 404 calculates the local feature amount. However, the extraction processing of the local feature point and the calculation processing of the local feature amount may be performed only within a local feature extraction range after the local feature extraction range is established. Referring to FIG. 7 and a flowchart in FIG. 8, a configuration example in this case will be described.

Figure 8:
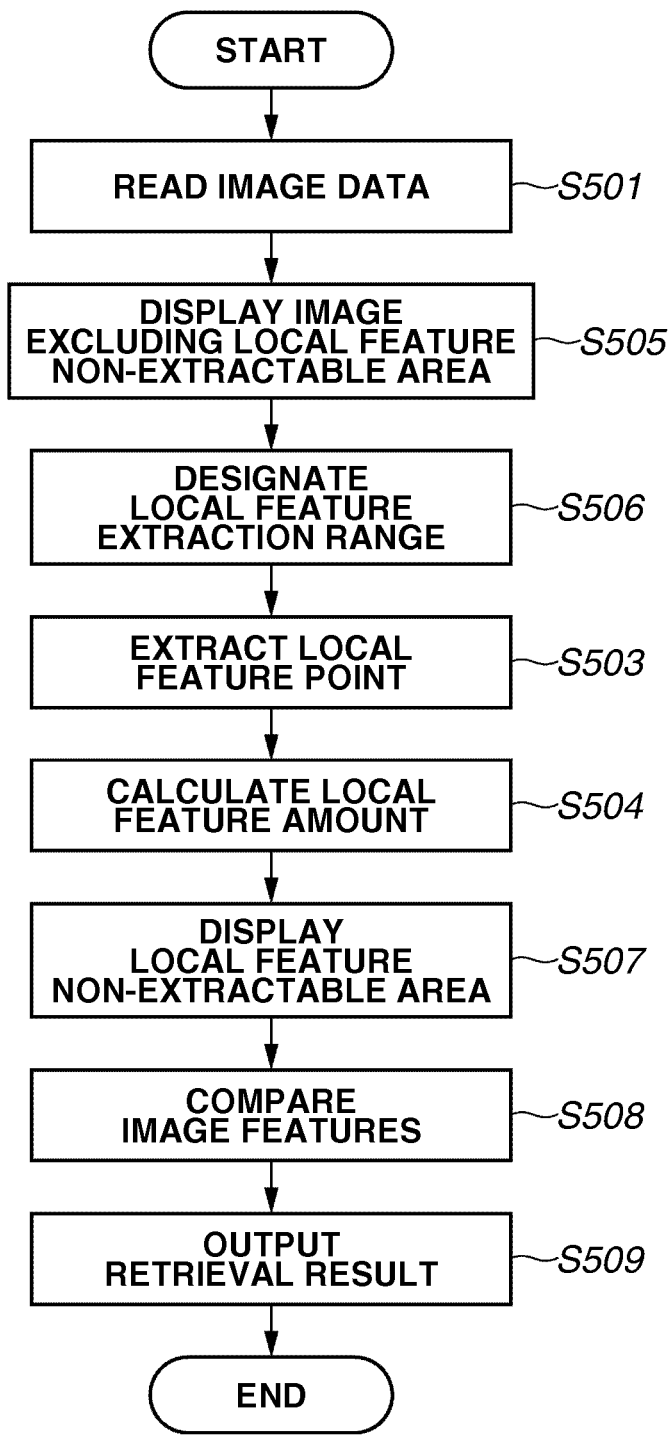
FIG. 8 is a second flowchart illustrating image retrieval processing and visualization processing of an extractable area.

FIG. 7 illustrates a second functional configuration of the image retrieval apparatus. FIG. 8 is a second flowchart illustrating an example of image retrieval processing and visualization processing of an extractable area.

FIG. 7 illustrates an image retrieval apparatus 600. In this configuration, extraction processing (step S503) of a local feature point by the local feature point extraction unit 403 and calculation processing (step S504) of a local feature amount by the local feature amount calculation unit 404 are executed after designation (step S506) of a local feature extraction range by the query area designation unit 407.

More specifically, in step S501, the image input unit 402 reads the query image 401. The read query image 401 is transmitted to a query image display unit 405. In step S505, the query image display unit 405 identifies a feature non-extractable area within the local feature extraction range based on the size of the blur filter and the size of the local feature amount calculation area, and displays only the extractable area 104 of the query image.

In step S506, based on a user's designation operation, the query area designation unit 407 designates an image area designated by the user to be used for retrieval as a local feature extraction range from the extractable area 104.

In step S503, the local feature point extraction unit 403 performs extraction processing of a local feature point from the local feature extraction range. In step S504, the local feature amount calculation unit 404 performs calculation processing of a local feature amount.

The local feature amount calculation unit 404 transmits the local feature extraction range to the designated area information visualization unit 406. The designated area information visualization unit 406 identifies a feature non-extractable area within the local feature extraction range based on the size of the blur filter and the size of the local feature amount calculation area, and transmits information about the feature non-extractable area to the query image display unit 405. In step S507, the query image display unit 405 displays the feature non-extractable area by shading. More specifically, an area displayed without shading in the local feature extraction range becomes an extractable area.

In step S508, the feature comparison unit 408 executes retrieval using only a local feature extracted from the extractable area. In step S509, the feature comparison unit 408 outputs a retrieval result image 409.

Referring to FIG. 6, a part of the above processing will be described. FIG. 6 illustrates the query image 800 read by the image input unit 402, the query image 810 where the feature non-extractable area has been established, and the gray portion 811 indicating the feature non-extractable area. FIG. 6 further illustrates a query image 820 where only the extractable area displayed in step S505 is displayed, a local feature extraction range 831 designated by the user in step S506, a feature non-extractable area 842 displayed by shading in step S507, and an extractable area 841. More specifically, retrieval is executed using only the local feature present in the extractable area 841.

In step S507, the query image display unit 405 may ask the user whether correction of the local feature extraction range is necessary. In this case, the extraction processing of the local feature point (step S503) and the calculation processing of the local feature amount (step S504) may be executed immediately before the comparison processing of the image feature (step S508). More specifically, the calculation processing of the local feature amount from within the designated local feature extraction range may be executed before the retrieval.

Thus, timing of the extraction processing of the local feature point by the local feature point extraction unit 403 (step S503) and the calculation processing of the local feature amount by the local feature amount calculation unit 404 (step S504) can be freely set.

As described above, in step S507, the query image display unit 405 displays the feature non-extractable area by shading. However, methods other than the shading display method may be employed as long as they can clearly identify the feature non-extractable area. For example, a display method may be used where the query image display unit 405 lowers a luminance level, performs coloring, or inverts a color for the feature non-extractable area.

In the above configuration, in step S505, the query image display unit 405 displays only the extractable area 104 of the received query image. However, the feature non-extractable area may be clearly indicated after displaying of the entire query image.

In the above configuration, in step S507, the designated area information visualization unit 406 identifies the feature non-extractable area within the local feature extraction range, and the query image display unit 405 displays the feature non-extractable area by shading. However, when the image retrieval apparatus selects a query image from images that have been registered in the image feature database 206, the query image is a query image from which a local feature amount has been calculated. In other words, the query image may include an area where it is not necessary to set any feature non-extractable area within the local feature extraction range (feature amount extracted area). In this case, the query image display unit 405 may not display the feature amount extracted area by shading.

As apparent from the above descriptions, in the image retrieval apparatus according to the present exemplary embodiment, when a user designates a part of a query image as a local feature extraction range, a local feature non-extractable area present within the local feature extraction range can be clearly indicated to the user. Thus, the user can easily confirm or recognize an area actually usable for retrieval, and a possibility of being unable to perform retrieval as intended can be reduced.

In the image retrieval apparatus according to the present exemplary embodiment, the user can correct the local feature extraction range after easily confirming or recognizing the area actually usable for retrieval. Thus, usability can be improved while a possibility of being unable to perform retrieval as intended is reduced.

Further, in the image retrieval apparatus according to the present exemplary embodiment, the designated area information visualization unit 406 identifies the feature non-extractable area within the local feature extraction range that the user has designated by the query area designation unit 407, and transmits the information about the feature non-extractable area to the query image display unit 405. Then the query image display unit 405 displays the feature non-extractable area by shading. However, the image retrieval apparatus may automatically determine whether to display the feature non-extractable area by shading according to the number of feature amounts extracted from the local feature extraction range designated by the user.

Referring to FIG. 4, processing for automatically determining whether to display the feature non-extractable area by shading will be described. First, the designated area information visualization unit 406 receives coordinate information about local feature amounts calculated on the query image from the local feature amount calculation unit 404, and receives the information about the local feature extraction range designated by the user from the query area designation unit 407.

Then, the designated area information visualization unit 406 counts the number of local feature amounts present within the local feature extraction range based on the coordinate information about the local feature amounts and the information about the local feature extraction range. The designated area information visualization unit 406 compares the counted number of local feature amounts with a predetermined threshold value, and identifies a feature non-extractable area within the local feature extraction range only when the number of feature amounts is equal to or less than the threshold value. The designated area information visualization unit 406 transmits information about the identified feature non-extractable area to the query image display unit 405.

In other words, while the user designates a part of the query image as a local feature extraction range, only when no sufficient number of feature amounts is extracted from the local feature extraction range, a feature non-extractable area within the local feature extraction range may be clearly indicated to the user. With this configuration, when a sufficient number of feature amounts are extracted from the local feature extraction range, and retrieval can be performed as intended by the user, unnecessary time and labor can be eliminated for the user.

On the other hand, when a possibility is high that sufficient number of feature amounts are not extracted from the local feature extraction range and retrieval cannot be performed as intended by the user, the user can easily confirm or recognize an area actually usable for retrieval. The possibility of being unable to perform retrieval as intended can be reduced. Thus, with the configuration where clear indication of the feature non-extractable area to the user is automatically switched, the possibility of being unable to perform retrieval as intended by the user can be reduced while unnecessary time and labor are removed for the user in the entire system, and usability can be improved.

In the above configuration, after the designation of the selected local feature extraction range by the user, the query image display unit 405 displays the local feature extraction range. However, before the user designates any local feature extraction range, a predetermined local feature extraction range of a minimum size may be displayed in a predetermined initial position. The minimum size of the local feature extraction range means a size having a high possibility that the number of feature amounts within the local feature extraction range is equal to or higher than a fixed number. In the present exemplary embodiment, the minimum size is determined beforehand by experiments or the like.

For a determination method of the initial position, for example, a position where a density per unit area of a local feature amount is highest may be set as an initial position. Alternatively, the query area designation unit 407 may record operation history for the local feature extraction range selected by the user, calculate a statistical amount from the record of the operation history, and determine an initial position based on the statistical amount. For example, the statistical amount may be an average coordinate position of points on the left upper side of the local feature extraction range.

As described above, for example, the designated area information visualization unit 406 may display the predetermined local feature extraction range of the minimum size in the predetermined initial position before the user designates the local feature extraction range. Accordingly, the user can understand a target size of the local feature extraction range beforehand, and hence a possibility of being unable to perform retrieval as intended can be reduced. The determination processing of the initial position enables presentation of the local feature extraction range of the minimum size in a place highly likely to be selected as the local feature extraction range by the user.

[Configuration of Apparatus]

Figure 9:
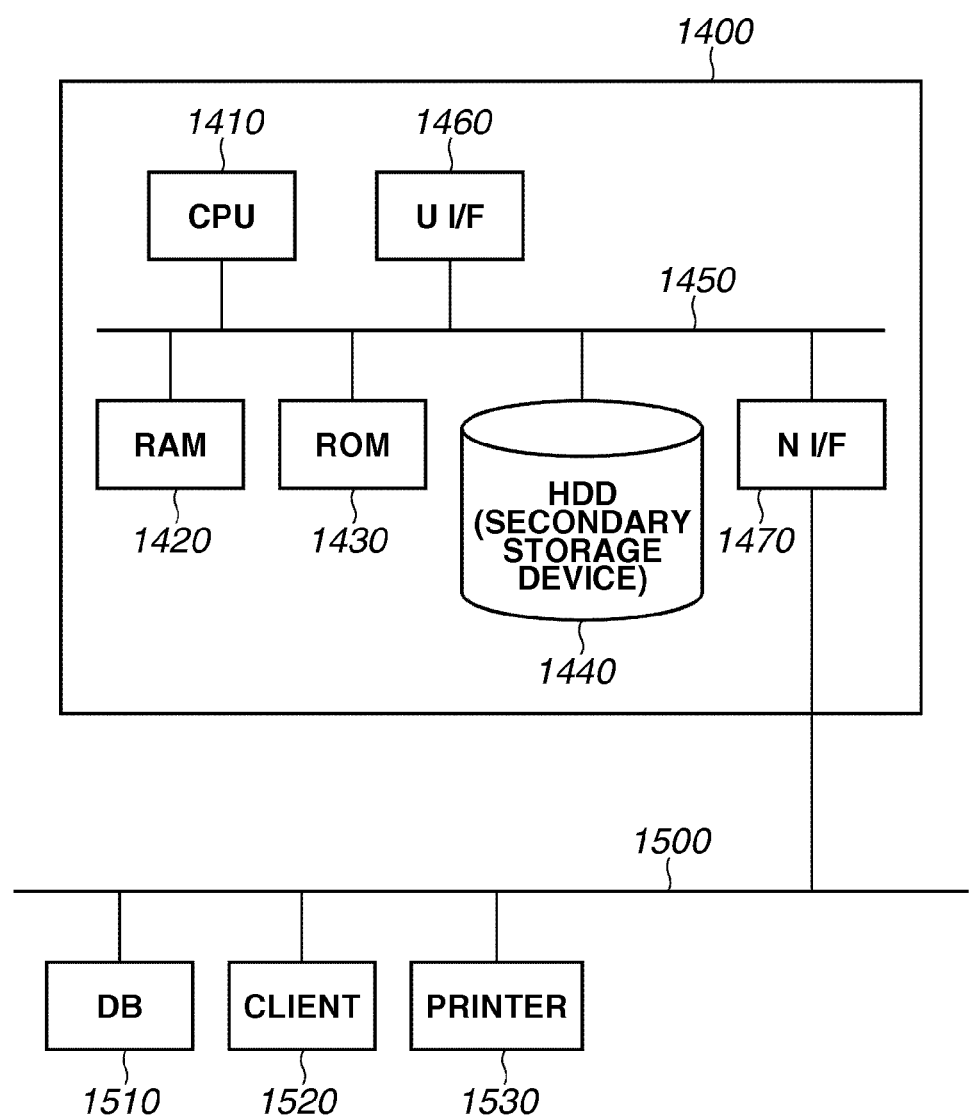
FIG. 9 illustrates an example of a hardware configuration of an image processing apparatus (computer) such as an image registration apparatus or an image retrieval apparatus.

FIG. 9 illustrates an example of a hardware configuration of an image processing apparatus (computer) such as an image registration apparatus or an image retrieval apparatus.

A central processing unit 410 (CPU) reads a program stored in a read-only memory (ROM) 1430 to a random access memory (RAM) 1420, and executes processing to realize the above described functions or the processing of the flowchart. A bus 1450 enables the ROM 1430, the RAM 1420, the CPU 1410, and a hard disk drive (HDD) 1440 to exchange data.

An image processing apparatus 1400 receives an input from an input-output device such as a keyboard or a mouse connected to a user interface 1460. The image processing apparatus 1400 inputs or outputs data for a network interface 1470. The network interface 1470 of the image processing apparatus 1400 can communicate with a database (DB) 1510, a client 1520, and a printer 1530 via a network 1500.

A plurality of hardware and software components may cooperate with one another to realize the functions of the image processing apparatus. For example, a part of the configuration illustrated in FIG. 2 and FIG. 4 may be realized by hardware (e.g., integrated circuit (IC)), or software as described above. In addition, the functions of the image processing apparatus may be realized by cooperation among a plurality of devices interconnected by a network.

To cite an example referring to FIG. 12, the image processing apparatus 1400 receives an image from the printer 1530 or the client 1520, and performs the processing of the flowchart in FIG. 3 to register a result of the processing in the database 1510. Alternatively, the image processing apparatus 1400 receives a retrieval request and a query image from the client 1520 or the printer 1530, and performs the processing of the flowchart in FIG. 5 to retrieve an image similar to the query image from the database 1510.

Next, processing will be described where the image retrieval apparatus determines whether the local feature extraction range designated by the user can be set in the extractable area, and transmits a notification to the user when the local feature extraction range cannot be set. Hereinafter, referring to FIGS. 10 and 11, the processing is described.

Figure 10:
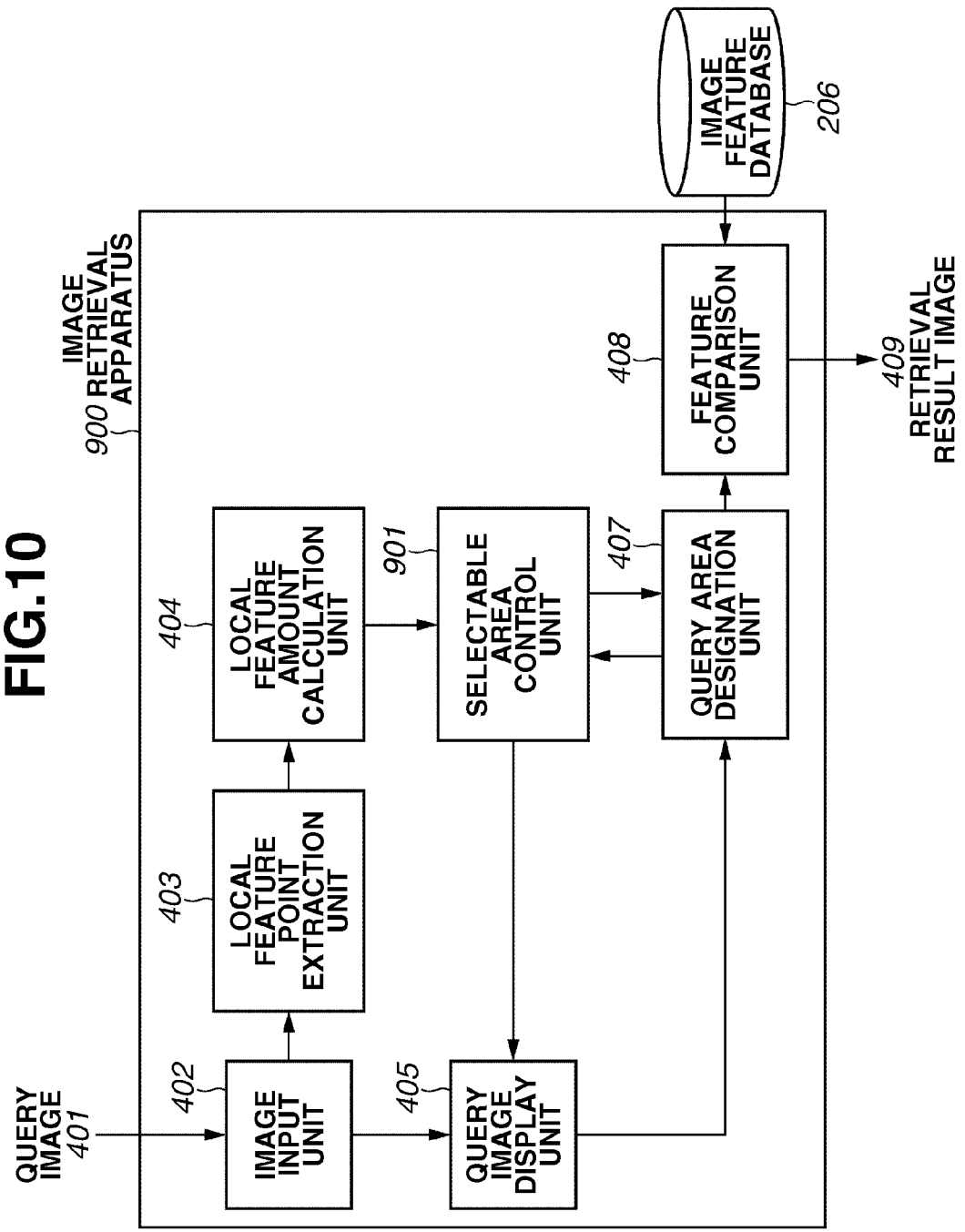
FIG. 10 illustrates a functional configuration of the image retrieval apparatus.
Figure 11:
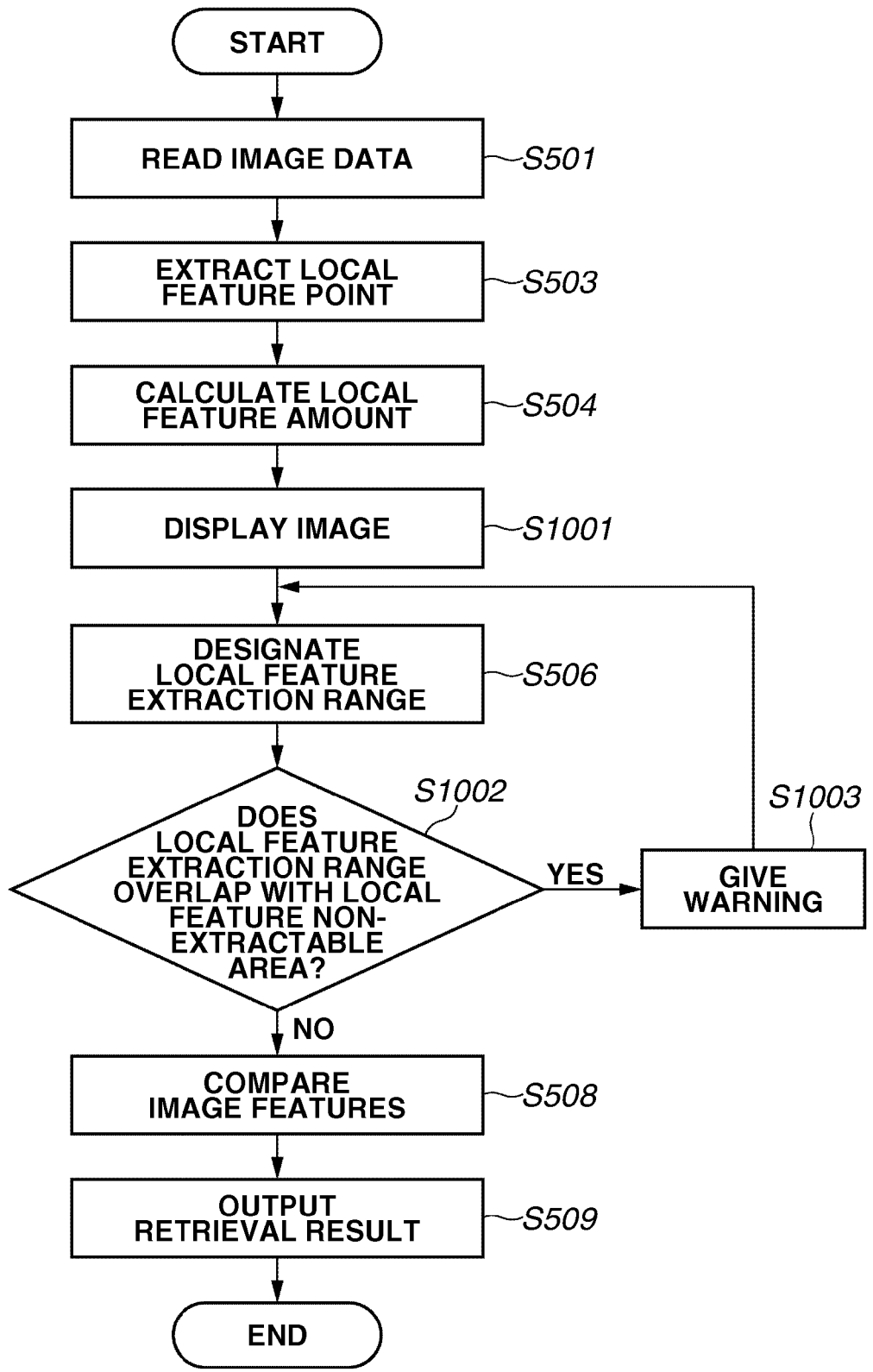
FIG. 11 is a flowchart illustrating an example of image retrieval processing and visualization processing of an extractable area.

FIG. 10 illustrates a functional configuration of the image retrieval apparatus. FIG. 11 is a flowchart illustrating an example of image retrieval processing and visualization processing of an extractable area. FIG. 10 illustrates an image retrieval apparatus 900. First, in step S501, an image input unit 402 reads a query image 401. The read query image 401 is transmitted to a query image display unit 405. In step S503, a local feature point extraction unit 403 extracts a local feature point from the query image 401.

For the extraction of the local feature point, the local feature point extraction unit 403 extracts a luminance component from the query image 401 to generate a luminance component image, reduces the luminance component image in stages, and performs blurring processing for each reduced image. The local feature point extraction unit 403 extracts a local feature point from each blurred image thus generated. As an extraction method of the local feature point, a Harris operator is used in the present exemplary embodiment.

The blurring processing is realized by convolution processing between an image and the blur filter, and hence the area 101 illustrated in FIG. 1 where the accurate filter processing is difficult is identified based on the size of the blur filter. No local feature amount can be calculated from the area 101 where the accurate filer processing is difficult. The local feature point extraction unit 403 transmits information about the identified area 101 where the accurate filter processing is difficult to a local feature amount calculation unit 404.

In step S504, the local feature amount calculation unit 404 calculates, for each extracted feature point, a local feature amount using a surrounding pixel value. In this case, a size of a local feature amount calculation area has been determined beforehand, and the area 101 where the accurate filter processing is difficult has been established. Thus, the local feature point extraction unit 403 can identify the area 102 where a local feature amount is difficult to be calculated and the extractable area 104 illustrated in FIG. 1. More specifically, the calculation of the local feature amount is performed in the extractable area 104.

Pieces of information about the local feature amount calculated in step S504, the area 101 where the accurate filter processing is difficult, the area 102 where the local feature amount is difficult to be calculated (feature non-extractable area), and the extractable area 104 are transmitted to the query image display unit 405 via a selectable area control unit 901. In step S1001, the query image display unit 405 displays the query image 401 received from the image input unit 402.

In step S506, based on a user's designation operation, a query area designation unit 407 designates an image area designated by a user to be used for retrieval as a local feature extraction range from the query image. The query area designation unit 407 transmits the local feature extraction range to the selectable area control unit 901.

In step S1002, the selectable area control unit 901 determines whether the local feature extraction range and the feature non-extractable area overlap each other using the information about the feature non-extractable areas (101 and 102) and the extractable area 104 received from the local feature amount calculation unit 404.

If the local feature extraction range and the feature non-extractable areas overlap each other (YES in step S1002), the selectable area control unit 901 notifies the query area designation unit 407 of that designation of the local feature extraction range is not permitted and cancels the local feature extraction range. Further, in step S1003, the selectable area control unit 901 notifies the user of that the local feature extraction range designated by the user is not permitted to prompt the user to perform designation again.

If the local feature extraction range and the feature non-extractable areas do not overlap each other (NO in step S1002), the selectable area control unit 901 transmits the information about the extractable area 104 to the query area designation unit 407, and notifies of retrieval permission. The query area designation unit 407 transmits the information about the extractable area 104 to the feature comparison unit 408, and instructs retrieval execution. In step S508, the feature comparison unit 408 executes retrieval by comparing a local feature present in the extractable area with a feature registered in the image feature database 206. In step S509, the feature comparison unit 408 outputs a retrieval result image 409.

For the notification described above, any method may be used as long as the user can recognize the notification. For example, the selectable area control unit 901 may emit a warning sound, or blink the local feature extraction range which overlaps with the feature non-extractable area via the query image display unit 405.

In the above description, when the local feature extraction range overlaps with the feature non-extractable area, the local feature extraction range is canceled. However, instead of cancellation, the selectable area control unit 901 may cause the user to correct the local feature extraction range. In this case, the selectable area control unit 901 does not cancel the notification while there is overlap between the local feature extraction range and the feature non-extractable area. The selectable area control unit 901 cancels the notification after user's correction has eliminated the overlap.

A correction method of the local feature extraction range may designate a new local feature extraction range, or correct the designated local feature extraction range. As a method for correcting the designated local feature extraction range, parallel movement or deformation may be used. Even after the correction of the designated local feature extraction range, cancellation of the designated local feature extraction range may be permitted. When the designation is canceled, a new local feature extraction range may be designated.

The query image display unit 405 may display the feature non-extractable area of the query image 401 based on an instruction from the designated area information visualization unit 406 or the selectable area control unit 901. Alternatively, the image retrieval apparatus may be configured to be able to set the feature non-extractable area in a display state or in a non-display state. When the feature non-extractable area is displayed, the feature non-extractable area only needs to be clearly indicated. As a clear indication method, a method may be used where the query image display unit 405 performs shade displaying, lowers a luminance level, performs coloring, or inverts a color for the feature non-extractable area.

In the above configuration, in step S501, the image input unit 402 reads the query image 401. In step S503, the local feature point extraction unit 403 extracts the local feature point from the query image 401. In step S504, the local feature amount calculation unit 404 calculates the local feature amount. However, the extraction processing of the local feature point and the calculation processing of the local feature amount may be performed only within a local feature extraction range after the local feature extraction range is established.

In the present exemplary embodiment, when the user designates a part of the query image as a local feature extraction range, and there is overlap between the local feature extraction range and the feature non-extractable area, the user is notified that designation of the local feature extraction range is not permitted. Thus, the user can easily confirm or recognize an area actually usable for retrieval, and a possibility of being unable to perform retrieval as intended can be reduced.

In the image retrieval apparatus according to the present exemplary embodiment, when a user designates a part of a query image as a local feature extraction range, a local feature non-extractable area present within the local feature extraction range can be clearly indicated to the user. Thus, the user can easily confirm or recognize an area actually usable for retrieval, and a possibility of being unable to perform retrieval as intended can be reduced.

In the image retrieval apparatus according to the present exemplary embodiment, the user can correct the local feature extraction range after easily confirming or recognizing the area actually usable for retrieval. Thus, usability can be improved while a possibility of being unable to perform retrieval as intended is reduced.

In the configuration illustrated in FIG. 6, when the user designates the image area to be used for retrieval as the local feature extraction range, the feature non-extractable area within the local feature extraction range is identified. However, in this configuration, there is the feature non-extractable area 842 within the local feature extraction range 831 designated by the user, and hence the extractable area 841 from which a local feature is actually extracted is narrower than the local feature extraction area 831 designated by the user. Thus, a configuration will be described in which the image retrieval apparatus is configured to automatically enlarge the local feature extraction range so that areas within the local feature extraction range designated by the user can all be extractable areas.

FIG. 12 is a block diagram illustrating an example of an interface during image segmentation in a form of supplementing the block diagram in FIG. 6. FIG. 12 illustrates a query image 800 read by the image input unit 402, a query image 810 where a feature non-extractable area has been established, a gray portion 811 indicating a feature non-extractable area, and a query image 820 in which only the extractable area displayed in step S505 is displayed.

FIG. 12 further illustrates a local feature extraction range 1101 designated by the user in step S506. In the present exemplary embodiment, the image retrieval apparatus automatically enlarges the local feature extraction range so that the feature non-extractable area can be located outside the local feature extraction range. FIG. 12 further illustrates a local feature extraction range 1103 after automatic enlargement, and a feature non-extractable area 1104. As a result, in the present exemplary embodiment, an extractable area is an area 1102.

The image retrieval apparatus according to the present exemplary embodiment is configured to automatically enlarge the local feature extraction range so that all the areas within the local feature extraction range designated by the user can be extractable areas. As apparent from the above descriptions, the user can easily confirm or recognize an area actually usable for retrieval, and a possibility of being unable to perform retrieval as intended can be reduced. Moreover, the user is not required to be aware of the feature non-extractable area, and hence usability can be improved.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-205213 filed Sep. 4, 2009, which is hereby incorporated by reference herein in its entirety.

What is claimed is:

1. An image retrieval apparatus comprising:
a designation unit configured to designate a query area of an image based on a user's designation operation;
a display unit configured to display an area where a local feature amount is difficult to be extracted in the query area designated by the designation unit as a feature non-extractable area; and
a retrieval unit configured to retrieve, based on a local feature amount extracted from an area which is not displayed as the feature non-extractable area in the query area by the display unit, image feature data with which a local feature amount and the image are associated and which is stored in a storage device.

2. The image retrieval apparatus according to claim 1, further comprising a comparison unit configured to compare a number of local feature amounts extracted from the query area designated by the designation unit with a threshold value,
wherein when a result of the comparison by the comparison unit indicates that the number of local feature amounts is equal to or less than the threshold value, the display unit displays the area where the local feature amount is difficult to be extracted as the feature non-extractable area in the query area designated by the designation unit.

3. The image retrieval apparatus according to claim 1, further comprising a correction unit configured to correct, after the feature non-extractable area is displayed by the display unit, the query area designated by the designation unit based on the user's designation operation.

4. The image retrieval apparatus according to claim 1, wherein the display unit displays an area other than the area where the local feature amount is difficult to be extracted as an extractable area in the query area designated by the designation unit, and
wherein the retrieval unit retrieves, based on a local feature amount extracted from the extractable area in the query area displayed by the display unit, the image feature data with which the local feature amount and the image are associated and which is stored in the storage device.

5. The image retrieval apparatus according to claim 4, further comprising a comparison unit configured to compare a number of local feature amounts extracted from the query area designated by the designation unit with a threshold value,
wherein when a result of the comparison by the comparison unit indicates that the number of local feature amounts is equal to or less than the threshold value, the display unit displays the area other than the area where the local feature amount is difficult to be extracted as the extractable area in the query area designated by the designation unit.

6. The image retrieval apparatus according to claim 4, further comprising a correction unit configured to correct, after the extractable area is displayed by the display unit, the query area designated by the designation unit based on the user's designation operation.

7. A method for image retrieval executed by an image retrieval apparatus, the method comprising:
designating a query area of an image based on a user's designation operation;
displaying an area where a local feature amount is difficult to be extracted in the designated query area as a feature non-extractable area; and
regarding an area which is not displayed as the feature non-extractable area in the query area as an extractable area and retrieving image feature data with which a local feature amount and the image are associated and which is stored in a storage device based on a local feature amount extracted from the extractable area.

8. A non-transitory computer-readable storage medium storing a program, which when loaded into a computer and executed performs a method for image retrieval executed by an image retrieval apparatus, the method comprising the steps of:
designating a query area of an image based on a user's designation operation;
displaying an area where a local feature amount is difficult to be extracted in the query area designated by the designating step as a feature non-extractable area; and
retrieving, based on a local feature amount extracted from an area which is not displayed as the feature non-extractable area in the query area by the displaying step, image feature data with which a local feature amount and the image are associated and which is stored in a storage device.

* * * * *